(No Model.)

G. LEBRUN & F. CORNAILLE.
BURNER FOR ACETYLENE OR OTHER GASES.

No. 605,886. Patented June 21, 1898.

Witnesses
R. Aberli
Geo. T. Morse

Inventors
Gustave Lebrun
and Fernand Cornaille
By Briesen & Knauth
his Attorneys

UNITED STATES PATENT OFFICE.

GUSTAVE LEBRUN AND FERNAND CORNAILLE, OF PARIS, FRANCE.

BURNER FOR ACETYLENE OR OTHER GASES.

SPECIFICATION forming part of Letters Patent No. 605,886, dated June 21, 1898.

Application filed October 5, 1897. Serial No. 654,102. (No model.) Patented in France March 4, 1897, No. 264,662, and in Belgium March 5, 1897, No. 126,739.

*To all whom it may concern:*

Be it known that we, GUSTAVE LEBRUN and FERNAND CORNAILLE, of the city of Paris, France, have invented a Burner for Acetylene or other Gases Rich in Carbon, (for which we have obtained Letters Patent in France for fifteen years, dated March 4, 1897, No. 264,662, and in Belgium for fifteen years, dated March 5, 1897, No. 126,739,) of which the following is a full, clear, and exact description.

This invention relates to a burner which is more particularly designed for burning acetylene gas, but adapted also as a burner for other gases rich in carbon.

The invention has for its object to avoid the heating of the burner during combustion of the gas and to prevent the accumulation of carbon deposits at the base of the flame.

The invention is illustrated, by way of example, in the accompanying drawings, in which—

Figure 1:
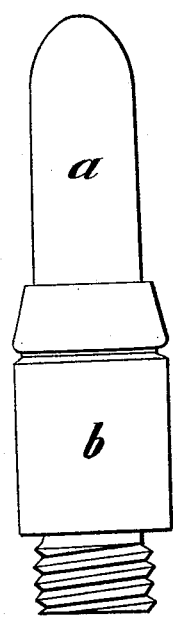
Figure 2:
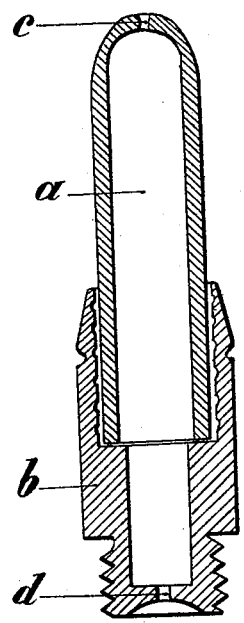

Figure 1 represents an elevation, and Fig. 2 a vertical section, of our improved burner, drawn on an enlarged scale.

The same letters of reference denote like parts in both figures.

$a$ is the burner or nipple, which is preferably made of opal glass set in a metal socket $b$, as shown. Glass is chosen as the material for the burner on account of its being a poor conductor of heat, and preference is given to white opal glass in order to lessen the radiation of heat. It is, however, to be understood that the burner may be made of any other kind of glass, or of enamel, or of other material possessing the same properties.

The extremity of the burner is made of parabolic form, as shown, to aid in the reflection of the heat-rays. The orifice $c$ for the emission of the gas presents externally the form of a hollow cone or crater with rounded edges, the object being to prevent the accumulation of carbon, and the walls of the nose of the burner, at the center of which is the orifice, are made of less thickness, as shown in Fig. 2, so that, conformably to the principle on which the construction of the burner is based, the continuous supply of fresh gas as combustion proceeds serves to cool the interior of the burner and limit its rise in temperature.

The burner may be suitably sealed in the metal socket. The base of the metal socket $b$ has a central hole $d$, which acts as a moderator and insures the interior of the burner being kept clean or free from deposit. It will be obvious that the means of fixing the burner in its socket may be varied without in any way changing the nature of the invention.

Having now particularly described and ascertained the nature of the said invention and in what manner the same is to be performed, we declare that what we claim is—

A burner for acetylene gas and other gases rich in carbon, consisting of a hollow cylindrical body having thin walls, and made of a material which is a poor conductor of heat, and having its upper rounded extremity made of paraboloidal form and provided with an emission-orifice for the gas made trumpet-shaped on the exterior and rounded on the interior, the walls of the nose of the burner at the center of which is the orifice being made of less thickness, so that the heating of the burner during combustion and the accumulation of carbon deposits are minimized, said burner being sealed in a metal socket having a central perforation at its base to act as a moderator and insure the interior of the burner being kept clean and free from deposit.

The foregoing specification of our burner for acetylene and other gases rich in carbon signed by us this 16th day of September, 1897.

GUSTAVE LEBRUN.
   FERNAND CORNAILLE.

Witnesses:
 EDWARD P. MACLEAN,
 MAURICE HENRI PIGNET.